United States Patent [19]

Silbernagel

[11] 4,216,932

[45] Aug. 12, 1980

[54] STAND FOR SUPPORTING A SIGN OR SIGNHOLDER

[76] Inventor: Hermann Silbernagel, Uhlandstrasse 7, 6800 Mannheim 1, Fed. Rep. of Germany

[21] Appl. No.: 900,525

[22] Filed: Apr. 27, 1978

[30] Foreign Application Priority Data

May 7, 1977 [DE] Fed. Rep. of Germany ... 7714522[U]

[51] Int. Cl.[2] .......... F16M 11/26; G09F 1/10

[52] U.S. Cl. .......... 248/156; 40/606; 248/188.5

[58] Field of Search .......... 248/466, 488, 172, 519, 248/520, 523, 346, 146, 148, 529, 156, 165, 440, 188.5; 40/606, 607, 610, 612, 155; 211/182

[56] References Cited

U.S. PATENT DOCUMENTS

| | | | |
|---|---|---|---|
| 1,326,755 | 12/1919 | Lowe et al. | 211/182 X |
| 2,559,302 | 7/1951 | Louft | 40/607 |
| 2,590,506 | 3/1952 | Carter | 40/606 |
| 3,168,200 | 2/1965 | Larson | 211/182 X |
| 3,829,999 | 8/1974 | Bernstein | 40/607 |
| 3,950,873 | 4/1976 | Stehle et al. | 40/606 |
| 4,037,835 | 7/1977 | Forsyth | 248/346 X |

FOREIGN PATENT DOCUMENTS

| | | | |
|---|---|---|---|
| 93824 | 4/1969 | France | 40/606 |

*Primary Examiner*—Rodney H. Bonck
*Attorney, Agent, or Firm*—Staas & Halsey

[57] ABSTRACT

A stand formed of a parallelopiped-shaped frame composed of tubes and perhaps other members as well as triangular-shaped cantilevers. Holding devices are affixed to the frame and cantilevers to adjustably and securely hold a plurality of feet to the stand. The adjustable feet allow the stand to rest securely on uneven ground. A vertical post is affixed to the stand to support a sign or signholder. The stand design enables the quick erecting and disassembling of traffic signs at construction sites.

19 Claims, 3 Drawing Figures

STAND FOR SUPPORTING A SIGN OR SIGNHOLDER

CROSS REFERENCE TO RELATED APPLICATIONS

Many of the elements of the present invention are also disclosed in the copending U.S. application Ser. No. 900,516 filed Apr. 27, 1978 and corresponding to German application No. G 7714522.3, filed May 7, 1977 and having common inventorship.

BACKGROUND OF THE INVENTION

1. Field of the Invention

The invention concerns a stand used to support a sign or signholder.

2. Description of the Prior Art

At building sites along traffic roads, particularly along public highways, a problem arises when temporary but adequate signs must be set up quickly at the building site in order to prevent accidents that could occur because of the traffic difficulties occasioned by the building activities. The act of providing the building site with signs must be carried out quickly by the workers, and it must be made possible to equip the building site completely with signs within a short period of time, so that no unexpected traffic obstacles are encountered by the driver even while the signs are being set up.

Again, the same problem arises in connection with the dismantling of the signs, which must be removed as quickly as possible, without the necessity of solving time-consuming problems related to the dismantling processes, so that the removal of the signs will not represent a traffic hazard.

Partial and incomplete signs are confusing to the passing driver both during the erection and the dismantling of the signs and therefore present a greater traffic hazard than when the building site is completely supplied with signs according to traffic regulations.

At the present time such signboards are usually set up by screwing one or more wooden beams or posts to the back of a sign, whereby a good part of the post below the lower edge of the sign is exposed and is knocked into the ground by a worker at the spot where the sign is to be set up. The disadvantages of setting up a sign in this manner arise from the fact that it can easily be toppled over by winds and that as a result of the saturation of the ground due to rain, the posts are not securely anchored in the ground and can easily collapse. Consequently, there is danger that after a sign falls down, the building site will be inadequately provided with signs, which may lead to accidents.

SUMMARY OF THE INVENTION

The aim of the invention is to provide a stand for the supporting of a sign or a signholder. Such a stand can be set up simply and quickly and into which a tube can be inserted without requiring the use of screws. After the tube has been inserted into the stand, it extends upwardly and therefore is suitable for the securing of a sign and its holder, whereby the stand prevents the sign and its holder against collapse.

According to the invention, this task is solved by having the stand consist of a parallelopiped-shaped frame of welded tubes and/or rails, with a vertical tube standing upright in the middle of the frame. The tubes may have a square cross-section, for example, while the rails may have a U-shaped cross-section.

According to a preferred embodiment of the stand of the invention, the stand has at its corner posts feet, with iron plates welded to the corner posts and projecting downwardly beyond the latter in order to stabilize the stand on the surface of the ground. The part of the iron plates projecting beyond the corner posts grip the soil on which the stand has been set up.

According to another embodiment of the present invention, the corner posts of the stand are formed by square tubes into which have been inserted additional square tubes having a smaller cross-section. These additional tubes are closed on one side with an iron plate projecting along the edges, whereby an iron plate is welded on one side of each of the corner posts and whereby each of the iron plates on the corner posts have at least one threaded hole such that the additional square tubes located in the interior of the corner posts can be secured at any place along the side of the additional square tube by means of a screw inserted through the threaded hole. The preferred embodiment of the stand of this invention enables the stand to rest horizontally on any surface whatever since each of the four additional tubes forming the feet of the stand can be secured at any place along its one side. Consequently, the four feet can project four different lengths beyond the bottom or lower side of the stand, with the result that the stand stands upright, although the surface on which its stands is slanting or uneven. It is understood that while the tubes in this embodiment, as well as those of the other embodiments, are shown as having square cross-sections, tubes having different cross-sections may be substituted.

According to a further preferred embodiment, holding devices have been affixed on two opposite sides of the stand according to the present invention for its stabilization; each of these holding devices form the guide for a cantilever. The cantilevers are welded into a triangle from flat irons and one side of each cantilever extends beyond its vertex and is bent into a hook. This preferred embodiment additionally secures the stand against a shift in its position since the cantilevers affixed to the two opposite sides enlarge the base surface of the stand and thus provide greater protection against collapse of the sign, especially in those cases when the stand according to the invention is used to support a large sign. When such a large sign is put up, the occasion arises that a very long tube is inserted into the square tube which rises vertically in the middle of the stand and the consequently greater leverage or moment is absorbed by the greater support surface area of the stand, formed by the two cantilevers affixed to the opposite sides.

According to a further preferred embodiment of the stand of the invention, a square tube with a threaded hole is welded to the outer ends of the cantilevers. Into these two square tubes other square tubes with a smaller cross-section can be inserted; these other square tubes are closed on one side by means of an iron plate projecting at the edges. These other square tubes can be secured at any place along their sides by means of screws inserted through the threaded holes. In case the stand does not rest on a horizontal surface, it is also necessary for the ends of the two cantilevers, like the stand, to have a variable distance from the ground surface. This is achieved by the insertion of the other square tubes forming feet into the square tubes attached to the outer ends of the cantilevers. As these inserted square tubes traverse the distance between the ground surface and the outer end of the cantilever and as this distance is adjustable or changeable, it can be chosen as dictated by the demands of the site.

According to a further preferred embodiment, the corner posts of the stand are connected on two opposite sides over the free area of the parallelopiped by means of rods, of which at least one is attached in a movable manner, so that the face of the parallelopiped partially covered by this rod, can be opened for access. According to this preferred embodiment, it is possible to introduce batteries into the interior of the parallelopiped. These batteries may serve to supply a lamp with current; this lamp is used on the sign set up with the stand as its base element. In order to secure these batteries against shifting within the interior of the skeleton or frame, for example, the described rods are attached to two opposite sides of the stand. To protect these batteries against theft, one can easily secure the movable rod by means of a locking device on a corner post. Upon unlocking this locking device, it is easy to remove these batteries from the interior of the parallelopiped.

The particular advantage of this invention is that a sign can be set up easily and quickly at the site without the traffic hindrances that often occur when complicated assembly activities occur. No changes have to be made in the ground surface, i.e., no drillings or excavations need be carried out whereby gas, electricity, water, or telephone lines might be damaged. In contrast, the stand according to the invention offers a base element that forms a safe support for a sign. By means of the preferred embodiments described above, it is furthermore possible to change and enlarge the ground surface of the stand in such a way that a sign may be erected on a non-level base.

BRIEF DESCRIPTION OF THE DRAWINGS

An embodiment of the invention is represented in the attached drawings and is described in detail below.

DESCRIPTION OF THE PREFERRED EMBODIMENT

Figure 1:
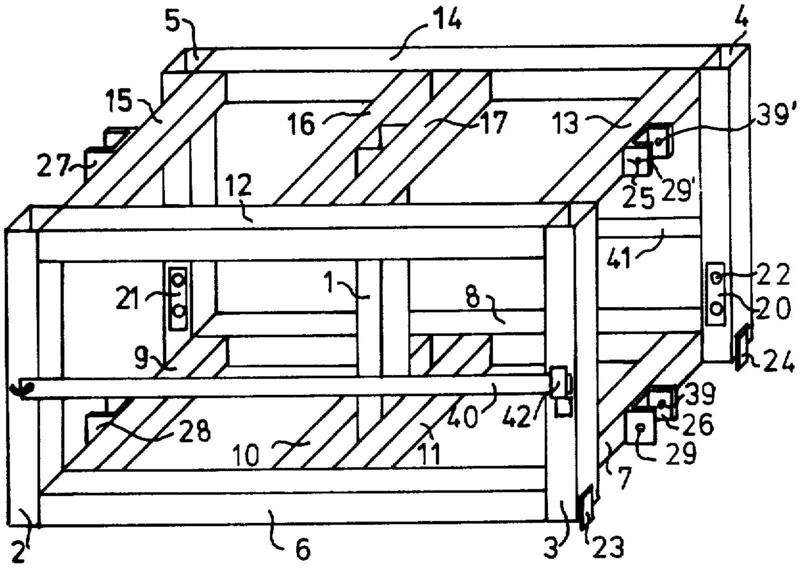
FIG. 1 shows a perspective view of a stand according to the invention.

FIG. 1 shows a stand consisting of five vertical square tubes 1–5, which are welded together by twelve iron rails. In this way, a parallelopiped-like skeleton or frame is formed. The lower ends of the four corner posts 2–5 are welded together with four iron rails 6–9. In this way, the rectangular basal area of the stand according to FIG. 1 is formed. Two iron rails with U-shaped profiles, 6 and 8, are welded together with two further iron rails 10 and 11. These two iron rails 10 and 11 are affixed to iron rails 6 and 8 in such a way that the space between these two iron rails 10 and 11 is exactly in the middle of the basal area. This space between the two iron rails 10 and 11 is determined by square tube 1, which is fixed in the center of the basal area of the stand. At the upper ends of the four corner posts 2–5 four iron rails with U-shaped profiles, 12–15, are also attached. These form the upper surface of the parallelopiped-shaped skeleton frame. Two iron rails, 12 and 14, which are above iron rails 6 and 8, are also connected by two iron rails 16 and 17, which are above iron rails 10 and 11. In the space between iron rails 16 and 17 is the upper end of square tube 1, which is welded to iron rails 16 and 17. This vertically standing square tube 1 accordingly forms an opening into which tubes with a smaller cross-section can be inserted from above. These tubes are then secured against collapse, as the basal area of the stand forms a safe base for the inserted tube. Any sign or signholder can then be affixed to the inserted tube. It is therefore possible to set up a stand according to the invention at any point and to set up a sign at this point simply by inserting a tube in square tube 1, whereby the tube is affixed to the sign.

Figure 2:
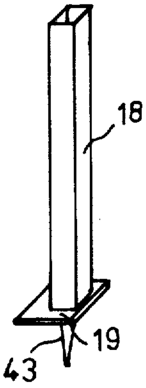
FIG. 2 shows a square tube with a welded iron plate, which serves as a foot that can be inserted into the stand according to the invention.

FIG. 2 shows a square tube 18, which is closed or terminated on one side by means of an iron plate 19, which projects along the edges. This square tube 18 has a smaller cross-section than the square tubes 2–5, shown in FIG. 1, which serves as corner posts of the stand. Hence, it is possible to insert from below square tubes with welded iron plates, as shown in FIG. 2, into the square tubes 2–5, as shown in FIG. 1. To one side of each corner post iron plates 20 and 21 have been welded, and the iron plate for each corner post contains at least one threaded hole 22. If a foot, as shown in FIG. 2, is inserted from below into the corner post 4, then the square tube 18 in corner post 4 can be held securely at any point or place along its side by means of a screw inserted in threaded hole 22 through iron plate 20 and corner post 4. It is possible in this way to alter at will the length of the part of the square tube 18 projecting downwardly from corner post 4. If one carries out this procedure on all four corner posts of the stand, then a foot with the desirable length projects from the lower end of each of the corner posts. In this way, the basal area of the stand shown in FIG. 1 can be adapted at will to the ground beneath the stand. Thus, it is possible to set up the stand even when the ground is slanting or uneven.

Pointed or rounded pins or pegs 43 can be welded to the iron plates 19; these pins or pegs 43 enable the foot shown in FIG. 2 to become firmly anchored to the ground underneath.

At the two corner posts 3 and 4, shown in FIG. 1, iron plates 23 and 24 are welded. These iron plates 23 and 24 project somewhat beyond the lower end of corner posts 3 and 4 and serve to dig into the ground when the stand is set up and thus contribute to its stabilization.

Figure 3:
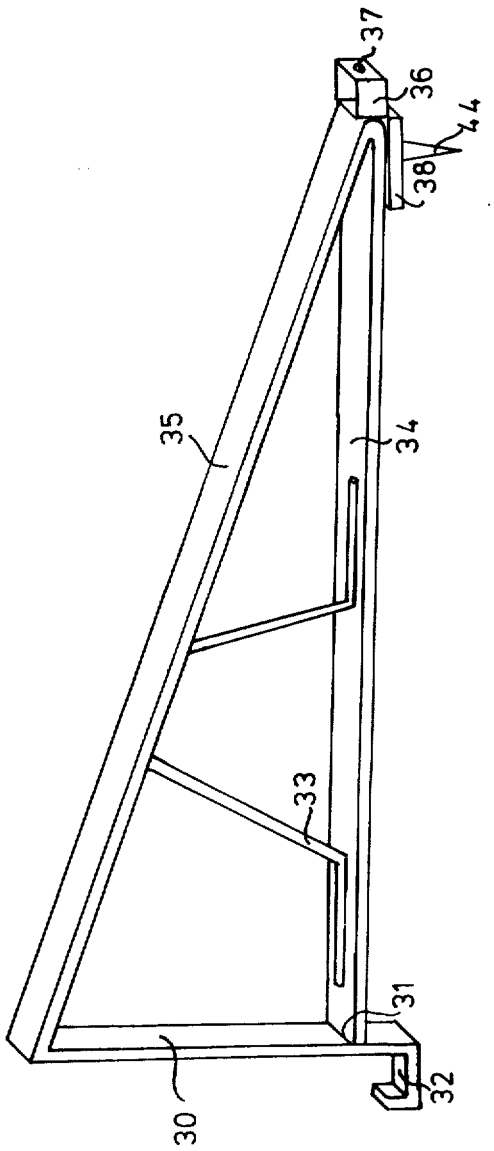
FIG. 3 shows a perspective view of a cantilever which can be used for the additional stabilization of the stand according to FIG. 1.

FIG. 1 furthermore shows holding devices 25–28, which consist of a piece of iron rail with a U-shaped profile. These devices are attached to the corresponding horizontal iron rails 7, 9, 13 and 15. The opening of the U-shaped profile of the holding devices 25–28 extends away from the stand. On each side two holding devices, 25 and 26, and 27 and 28, are arranged one above the other. All the holding devices are attached in the middle of their respective iron rails; e.g., holding device 25 is in the middle of iron rail 13. These holding devices 25–28 form the guide for cantilevers. One such cantilever is shown in FIG. 3. This cantilever is formed from a flat iron which is welded to form a triangle. Side 30 of the triangle extends beyond vertex 31 and forms hook 32. To stabilize the triangle, a round iron or rod 33 was welded to the two sides 34 and 35 of the triangle. At the vertex formed by the two sides 34 and 35, there is a square tube 36, which has been provided with a threaded hole 37. An iron plate 38 is welded to side 34.

Pointed or rounded pegs or pins 44 may be welded to this iron plate 38 to make it possible for the end of the cantilever shown in FIG. 3 to maintain a secure hold to the ground underneath.

The cantilever shown in FIG. 3 is placed with side 30 along a side of the stand shown in FIG. 1; on this side, there are two of the holding devices 25–28 described above. If this cantilever is placed along the side which has holding devices 25 and 26, then hook 32 is interlocked from below with the U-shaped profile of iron rail 7. It should be noted that side 30 would be located in the U-shaped profile of holding devices 25 and 26. In this way, the shifting of the cantilever shown in FIG. 3 is avoided. It is desirable that the holding devices have borehold openings. These boreholes, 29 and 39, are shown in FIG. 2 as being located on the free sides of the U-shaped profile of the holding device 26. When a cantilever is located in the U-shaped profile of holding device 26, a pin can be pushed through the openings 29 and 39 to prevent the cantilever from changing its position. Similarly, openings 29' and 39', which are located on holding device 25, serve to receive such a pin or stop.

At the outer end of the cantilever shown in FIG. 3, iron plate 38 is welded to the bottom. This plate 38 serves as the base of the cantilever at its outer point. It is desirable to have this base surface 38 somewhat larger than the base surface formed by the outer end of side 34. According to a preferred embodiment, there is a square tube 36 with a threaded hole 37 at the outer vertex of the cantilever formed by the intersection of sides 35 and 34. Into this square tube 36, a foot, as shown in FIG. 2, can be inserted from below if the cross-section of the square tube 18 is smaller than the cross-section of square tube 36. After this foot has been inserted from below into square tube 36, square tube 18 can be secured at any place along one of its sides by means of a screw inserted through threaded hole 37. Thus, the length of the part of square tube 18 projecting downwardly can be chosen at will. When a stand as illustrated in FIG. 1 having a cantilever as illustrated in FIG. 3 is set up on an uneven surface, the stand can nevertheless be erected vertically since the inserted foot with its variable length can be adjusted to traverse the distance between the end of the cantilever and the ground surface.

In FIG. 1, moreover, two rods, 40 and 41, are shown connecting the two corner posts 2 and 3 and 4 and 5, respectively. The rod 41 connecting corner posts 4 and 5 is solidly welded to both of the corner posts, whereas rod 40 is attached in a movable manner to corner posts 2 and 3. Rod 40 can be removed from hook 42 by pushing it upwardly, thus making the interior of the stand accessible. It therefore becomes possible to insert batteries from the front into the interior of the stand shown in FIG. 1. These batteries may then be placed in their proper position within. When rod 40 has been reattached with its outer end behind hook 42, the batteries inside the stand are protected against falling out. If the stand is intended to serve as the base element for the erection of a sign that is to be illuminated, then these batteries provide the energy source for the electric light or lights.

It is furthermore possible to introduce into the free space in the interior of the parallelopiped-shaped frame bodies (i.e., so-called center of gravity bodies) which serve to increase the stability of the stand according to the invention. Such center of gravity bodies may consist of concrete blocks.

It is to be understood that, for illustrative purposes only, the elements of the stand according to the present invention have been described as being of iron. It is understood that other metals (e.g., aluminum, steel, etc.) or nonmetals (e.g., fiberglass) could also be substituted. Similarly, other cross-sectional shapes could be substituted for the square cross-sectional shapes described above.

I claim:

1. A stand for supporting one of a sign and a sign-holder, comprising a parallelopiped-shaped welded frame having corner posts and of a plurality of square tubes and a plurality of elongated members, wherein one of said plurality of square tubes is arranged vertically in the center of said frame, and further comprising a plurality of iron plates welded to the corner posts of said frame, said plates projecting downwardly beyond said corner posts, and wherein the corner posts of said frame are formed by said plurality of square tubes, and said stand further comprises:

a plurality of additional square tubes, said additional tubes inserted into said plurality of square tubes forming said corner posts, said additional square tubes having a smaller cross-section than said plurality of square tubes and each closed on one end with an iron plate projecting beyond the edges thereof;

a plurality of other iron plates, each welded to one side of one of said corner posts, each other iron plate and its respective corner post containing at least one threaded hole and respective mating screw, wherein each of said plurality of additional square tubes inserted within its respective corner post is held securely at any position along its length by means of said screw inserted into its respective at least one threaded hole.

2. A stand according to claim 1, further comprising a plurality of second additional square tubes, each having a threaded hole and respective mating screw and each welded to a vertex opposite the extended side of its respective cantilever.

3. A stand according to claim 2, wherein the corner posts are connected on two opposite sides across the open faces of the stand by means of a plurality of rods, at least one rod being movably attached across its respective face, whereby said rod may be moved to allow its respective face to be unobstructed.

4. A stand as in claim 2, further comprising a plurality of third additional square tubes, identical in shape to said additional square tubes and each inserted within respective second additional square tubes and held securely at any position along its length by means of said screw inserted in its respective threaded hole.

5. A stand according to claim 1, further comprising a plurality of holding devices and cantilevers, each of said holding devices affixed to two opposite sides of said stand, each of said holding devices forming the guide for one of said cantilevers, wherein each of said cantilevers is formed from flat iron members welded into a triangular shape with one side of each cantilever extending beyond its vertex and terminating in a hook.

6. A stand according to claim 5, wherein the corner posts are connected on two opposite sides across the open faces of the stand by means of a plurality of rods, at least one rod being movably attached across its respective face, whereby said rod may be moved to allow its respective face to be unobstructed.

7. A stand according to claim 1, wherein the corner posts are connected on two opposite sides across the open faces of the stand by means of a plurality of rods, at least one rod being movably attached across its respective face, whereby said rod may be moved to allow its respective face to be unobstructed.

8. A stand for supporting one of a sign and a sign-holder, comprising a parallelopiped-shaped welded frame having corner posts and of a plurality of square tubes and a plurality of elongated members, wherein one of said plurality of square tubes is arranged vertically in the center of said frame, and further comprising a plurality of iron plates welded to the corner posts of said frame, said plates projecting downwardly beyond said corner posts, and further comprising a plurality of holding devices and cantilevers, each of said holding devices affixed to two opposite sides of said stand, each of said holding devices forming the guide for one of said cantilevers, wherein each of said cantilevers is formed from flat iron members welded into a triangular shape with one side of each cantilever extending beyond its vertex and terminating in a hook.

9. A stand according to claim 8, wherein the corner posts are connected on two opposite sides across the open faces of the stand by means of a plurality of rods, at least one rod being movably attached across its respective face, whereby said rod may be moved to allow its respective face to be unobstructed.

10. A stand for supporting one of a sign and a sign-holder, comprising a parallelopiped-shaped welded frame having corner posts and of a plurality of square tubes and a plurality of elongated members, wherein one of said plurality of square tubes is arranged vertically in the center of said frame, and further comprising a plurality of iron plats welded to the corner posts of said frame, said plates projecting downwardly beyond said corner posts, and wherein the corner posts are connected on two opposite sides across the open faces of the stand by means of a plurality of rods, at least one rod being movably attached across its respective face, whereby said rod may be moved to allow its respective face to be unobstructed.

11. A stand according to claims 1, or 8, or 10, wherein said plurality of elongated members comprise square tubes.

12. A stand according to claims 1, or 8, or 10, wherein said plurality of elongated members comprise U-shaped iron rails.

13. A stand for supporting one of a sign and a sign-holder comprising a parallelopiped-shaped frame having corner posts and of a plurality of tubes and a plurality of elongated members, wherein one of said plurality of tubes is arranged vertically in the center of said frame, and further comprising a plurality of plates affixed to the corner posts of said frame, said plates projecting downwardly beyond said corner posts, and wherein the corner posts of said frame are formed by said plurality of tubes, and said stand further comprises:

a plurality of additional tubes having the same cross-sectional shape as said plurality of tubes, said additional tubes inserted into said plurality of tubes forming said corner posts, and said additional tubes having a smaller cross-section than said plurality of tubes and each closed on one end with a plate projecting beyond the edges thereof;

a plurality of other plates, each affixed to one side of one of said corner posts, each other plate and its respective corner post containing at least one threaded hole and respective mating screw, wherein each of said plurality of additional tubes inserted within its respective corner post is held securely at any position along its length by means of said screw inserted into its respective at least one hole.

14. A stand as in claim 13, further comprising a plurality of second additional tubes, each having a threaded hole and respective mating screw and each affixed to the vertex opposite the extended side of its respective cantilever.

15. A stand as in claim 14, further comprising a plurality of third additional tubes, identical in shape to said additional tubes and each inserted within respective second additional tubes and held securely at any position along its length by means of said screw inserted in its respective threaded hole.

16. A stand for supporting one of a sign and a sign-holder comprising a parallelopiped-shaped frame having corner posts and of a plurality of tubes and a plurality of elongated members, wherein one of said plurality of tubes is arranged vertically in the center of said frame, and further comprising a plurality of plates affixed to the corner posts of said frame, said plates projecting downwardly beyond said corner posts, and further comprising a plurality of holding devices and cantilevers, each of said holding devices affixed to two opposite sides of said stand, each of said holding devices forming the guide for one of said cantilevers, wherein each of said cantilevers is triangular in shape with one side of each cantilever extending beyond its vertex and terminating in a hook.

17. A stand for supporting one of a sign and a sign-holder comprising a parallelopiped-shaped frame having corner posts and of a plurality of tubes and a plurality of elongated members, wherein one of said plurality of tubes is arranged vertically in the center of said frame, and further comprising a plurality of plates affixed to the corner posts of said frame, said plates projecting downwardly beyond said corner posts, and wherein the corner posts are connected on two opposite sides across the open faces of the stand by means of a plurality of members, at least one member being movably attached across its respective face, whereby said member may be moved to allow its respective face to be unobstructed.

18. A stand according to claims 13, or 16, or 17, wherein said plurality of elongated members comprise tubes.

19. A stand according to claims 13, or 16, or 17, wherein said plurality of elongated members comprise solid members.

* * * * *